United States Patent

Bergeleen

(10) Patent No.: US 6,263,973 B1
(45) Date of Patent: Jul. 24, 2001

(54) HORSESHOE WITH A PLURALITY OF NAIL HOLE PATTERNS

(76) Inventor: Lyle (Bergy) Bergeleen, 6429 N. Altamont St., Spokane, WA (US) 99217

(*) Notice: Subject to any disclaimer, the term of this patent is extended or adjusted under 35 U.S.C. 154(b) by 0 days.

(21) Appl. No.: 09/326,903

(22) Filed: Jun. 7, 1999

(51) Int. Cl.$^7$ .................................................. A01L 1/00
(52) U.S. Cl. .................................................................. 168/4
(58) Field of Search ...................................... 168/4, 13, 24

(56) References Cited

U.S. PATENT DOCUMENTS

| | | | |
|---|---|---|---|
| 158,284 | * 12/1874 | Kintzing et al. | 168/4 |
| 279,758 | 6/1883 | Hicks | 168/24 |
| 346,350 | 7/1886 | Bingham | 168/4 |
| 506,820 | 10/1893 | Jerome | 168/4 |
| 542,546 | 7/1895 | Walker | 168/24 |
| 782,693 | 2/1905 | Piedilate | 168/4 |
| 1,130,834 | 3/1915 | Nolan | 168/4 |
| 1,946,636 | 2/1934 | Nygard | 168/4 |
| 2,024,265 | * 12/1935 | Anderson et al. | 168/4 |
| 2,622,685 | 12/1952 | Dixon | 168/13 |
| 3,425,493 | * 2/1969 | Kulak | 168/4 |
| 3,841,408 | 10/1974 | Bucalo | 168/7 |
| 3,913,679 | 10/1975 | Bucalo | 168/8 |
| 4,116,278 | 9/1978 | Spencer | 168/4 |
| 4,513,824 | 4/1985 | Ford | 168/4 |
| 4,993,494 | 2/1991 | Tuunanen | 168/4 |
| 5,004,052 | * 4/1991 | Appleton | 168/4 |
| 5,105,891 | * 4/1992 | Noffsinger | 168/4 |
| 5,421,415 | 6/1995 | Wells | 168/4 |
| 5,566,765 | * 10/1996 | Ovnicek | 168/24 |

FOREIGN PATENT DOCUMENTS

| | | |
|---|---|---|
| 105414 | 10/1899 | (DE). |
| 265088 | 11/1912 | (DE). |
| 151540 | 7/1937 | (DE). |
| 3414458 | 10/1985 | (DE). |
| 3542759 | 2/1987 | (DE). |
| 2101463 | 1/1983 | (GB). |
| 52101463 | 1/1983 | (GB). |
| 2262425 | 6/1993 | (GB). |
| 8501443A | 12/1986 | (NL). |

* cited by examiner

Primary Examiner—Charles T. Jordan
Assistant Examiner—Elizabeth Shaw
(74) Attorney, Agent, or Firm—David S. Thompson

(57) ABSTRACT

A horseshoe 10 with a plurality of nail patterns provides opposed mirror-image left and right branches 20, 30 connected by a bridge 40. The bridge is flexible enough that the left and right branches are able to move with respect to each other in response to the "splaying" or radial expansion of the horse's hoof when weight is applied. Scribe marks 50 defined on the lower surface of the bridge provide indica to guide a horseshoer in grinding the bridge to provide greater flexibility. At least two nail hole patterns, an inner nail pattern 60 and an outer nail pattern 70 are defined between the upper and lower surfaces of the left and right branches. The inner nail hole pattern is used where the horse's hoof wall is approximately ⅜" thick and generally healthy. The outer nail hole pattern is used where the hoof wall thickness is much less, often approximately ⅛", and the hoofs health is devastated. A groove 80 defined in the lower surface of each of the branches, links the nail holes of the inner and/or outer nail hole patterns and tends to promote traction. A tapered region 90 defined in each branch interacts with the flexible bridge by tending to move the branches of the shoe away from each other when the horse applies weight.

4 Claims, 2 Drawing Sheets

HORSESHOE WITH A PLURALITY OF NAIL HOLE PATTERNS

CROSS-REFERENCES

There are no applications related to this application filed in this or any foreign country.

BACKGROUND

The use of horseshoes is closely related to the health of a horse's hoof. It is known that the flexibility of a horseshoe has a significant effect on the hoof of the horse. In general, a stiffer horseshoe may be advantageous for work or racing, but a softer, more flexible shoe is typically healthier for the hoof when engaged in less strenuous activities or during the healing process.

The horse with damaged or unhealthy hoofs needs special attention. The thickness of the hoof wall is a key indicator of the hoofs health. Due to the thin hoof wall which characterizes some damaged and unhealthy hoofs, nailing known horseshoes is difficult, dangerous or ill-advised. Special shoes may be needed, although such shoes are generally unavailable.

For the foregoing reasons, what is needed is a horseshoe that attaches to a healthy hoof in a standard manner, but which is adaptable to a damaged, unhealthy or devastated hoof in a different manner, particularly taking into account the thinner structure of such hoofs. The horseshoe should be more flexible when attached to the damaged hoof, thereby promoting healing and comfort through a more natural pressure relief and maximized blood circulation.

SUMMARY

The present invention is directed to an apparatus that satisfies the above needs. A novel horseshoe with a plurality of nail hole patterns is disclosed that provides some or all of the following structures.

(A) The horseshoe provides opposed mirror-image left and right branches 20, 30 connected by a bridge 40.

(B) The bridge is flexible enough that the left and right branches are able to move with respect to each other in response to the "splaying" or radial expansion of the horse's hoof when weight is applied.

(C) Scribe marks 50 defined on the inner portions of the lower surface of the bridge act as a quick reference guide to indicate varying degrees to which the bridge may be ground away, thereby resulting in a horseshoe of varying degrees of flexibility.

(D) At least two nail hole patterns, an inner nail pattern 60 and an outer nail pattern 70, are defined between the upper and lower surfaces of the left and right branches. The inner nail hole pattern is used where the horse's hoof wall is approximately ⅜" thick and generally healthy. The outer nail hole pattern is used where the hoof wall thickness is much less, often approximately ⅛", and the hoof health is devastated.

(E) A groove 80, defined in the lower surface of each of the branches, links the nail holes of the inner and/or outer nail hole patterns and tends to promote traction.

(F) A tapered region defined on the lower surface of each branch interacts with the flexible bridge by tending to move the branches of the shoe away from each other when the horse applies weight.

It is therefore a primary advantage of the present invention to provide a novel horseshoe with at least two nail patterns, typically including inner and outer nail patterns, that allows use of the shoe with an outer nail pattern for horses having an unhealthy hoof during the healing process, and that allows use of the shoe with an inner nail pattern for horses having a healthy or recovered hoof.

Another advantage of the present invention is to provide a novel horseshoe with a flexible bridge portion, defined between the left and right branches, that flexes with the application of weight by the horse, thereby reducing the strain on the hoof. The flexible bridge interacts with a tapered region defined on a lower surface of each of the branches which tends to cause a radially outward force when weight is applied. Also, the flexible bridge interacts with the at least two nail patterns, since the magnitude of the radially outward force applied by the horse's hoof can be varied according to the thickness of the bridge and also according to which nail pattern is used.

A still further advantage of the present invention is to provide a novel horseshoe with at least two nail patterns, typically including inner and outer nail patterns, wherein the nail holes comprising the outer nail hole pattern may be smaller and adapted for use with smaller nails appropriate to a thinner, damaged hoof, and wherein the nail holes comprising the inner pattern may be larger and adapted for use with larger nails appropriate to thicker, healthy hoofs.

DRAWINGS

These and other features, aspects, and advantages of the present invention will become better understood with regard to the following description, appended claims, and accompanying drawings where:

DESCRIPTION

Figure 1:
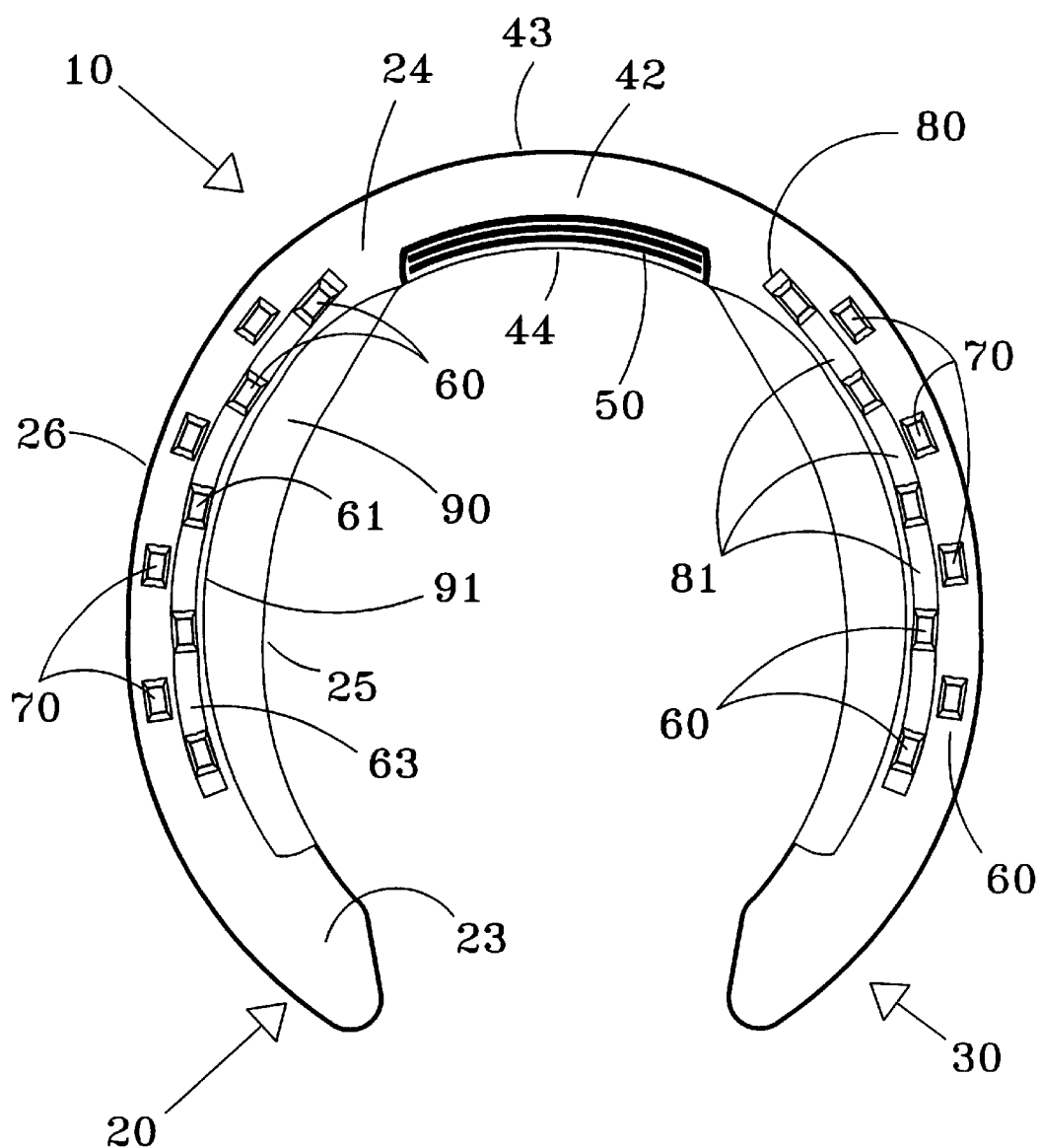
FIG. 1 is an isometric view of a front horseshoe version of the invention.

Referring generally to FIGS. 1 through 4, a horseshoe 10 with a plurality of nail patterns constructed in accordance with the principles of the invention is seen. The horseshoe provides opposed mirror-image left and right branches 20, 30 connected by a bridge 40. The bridge is flexible enough that the left and right branches are able to move with respect to each other in response to the expansion of the horse's hoof when weight is applied. Scribe marks 50 defined on the lower surface of the bridge provide indica to guide a horseshoer in grinding the bridge to provide greater flexibility. At least two nail hole patterns, an inner nail pattern 60 and an outer nail pattern 70 are defined between the upper and lower surfaces of the left and right branches. The inner nail hole pattern is used where the horse's hoof wall is approximately ¼" to ⅜" thick and generally healthy. The outer nail hole pattern is used where the hoof wall thickness is much less, often approximately ⅛", and the hoof's health is devastated. A groove 80 defined in the lower surface of each of the branches, links the nail holes of the inner and/or outer nail hole patterns and tends to promote traction. A tapered region 90 defined in each branch interacts with the flexible bridge by tending to move the branches of the shoe away from each other when the horse applies weight.

Figure 2:
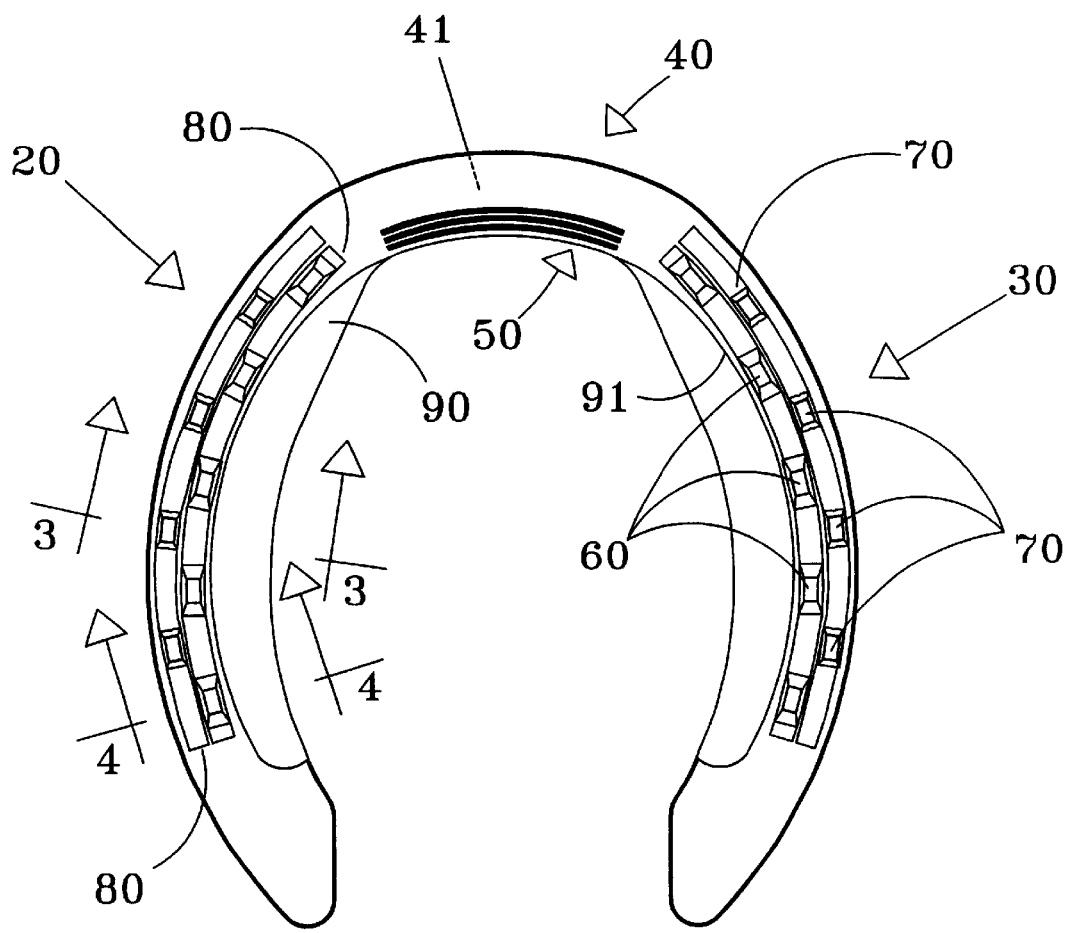
FIG. 2 is an isometric view of a rear horseshoe version of the invention.
Figures 3, 4:
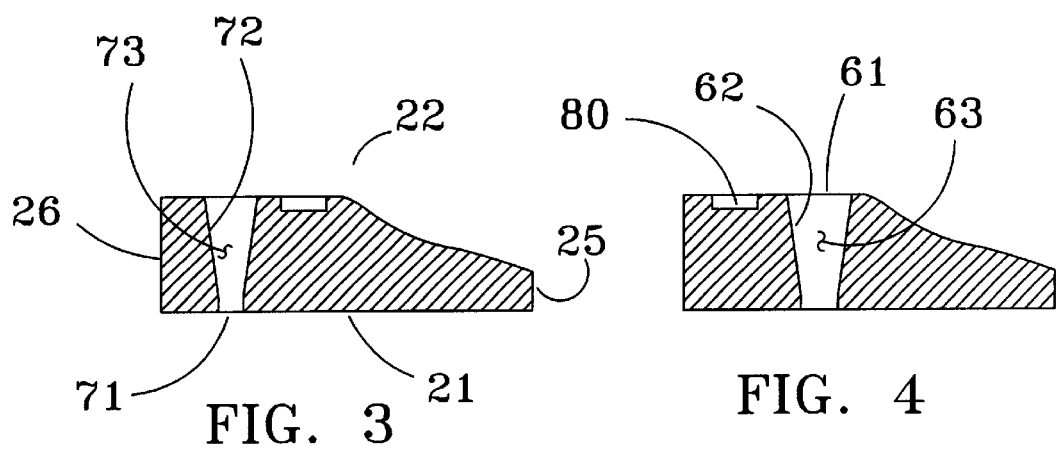
FIG. 3 is a cross-section of the horseshoe of FIG. 1, showing a nail hole in the outer pattern.
FIG. 4 is a cross-section of the horseshoe of FIG. 1, showing a nail hole in the inner pattern.

As seen in FIGS. 1 and 2, each horseshoe 10 provides mirror-image left and right branches 20, 30 connected by a bridge 40. Each branch provides an upper surface 21 in contact with the horse's hoof, and a lower surface 22 which is in contact with the ground. A base 23 is generally rounded, and the opposed upper and lower surfaces 21, 22 are generally parallel in this area.

As seen by a careful comparison of FIGS. 1 and 2, the horseshoe intended for the front hoof is somewhat wider than the horseshoe intended for the rear hoof. However, the exact dimensions of either shoe can be made to fit any desired application.

A tapered region 90 is defined on the lower surface 22 of each branch. As seen in the cross-sectional views of FIGS. 3 and 4, the tapered region is defined on an inside surface of each branch element, between a ridge line 91 and the inside curved edge 25. As a result, when weight is applied to the hoof wearing the shoe, the ground tends to push on the shoe in a direction perpendicular to the surface of the tapered region, causing a force applied to the bridge having a radially outward component vector.

As seen in FIGS. 1 and 2, the upper portions 24 of each of the left and right branches 20, 30 are connected by a bridge 40. The bridge is somewhat flexible, in that when the horses weight is applied to the shoe, the base portions 23 of the left and right branches tend to move apart a fraction of an inch. The thickness of the bridge, i.e. the distance between an upper surface 41 next to the horse's hoof, and a lower surface 42 next to the ground, is approximately equal to the thickness of the left and right branches. However, the width of the bridge, from a forward curved edge 43 to a rearward curved edge 44, is less than the distance between an inside curved edge 25 and an outside curved edge 26 of either the left or right branches. As a result, the bridge is more flexible than standard horse shoes.

As seen in FIGS. 1 and 2, scribe marks 50 are protrude from the lower surface 42 of the bridge 40. In a preferred embodiment, three scribe marks are used, each scribe mark being approximately $1/16$" in width and approximately the length of the bridge.

The scribe marks allow the flexibility of the horseshoe to be adjusted by grinding away a portion of the bridge. The scribe marks function to provide a reference indicator to a horseshoer so that an inside portion of the bridge may be ground away, resulting in a more flexible shoe. For example, where the inside surface of the rearward curved edge 44 is ground away up to the inner scribe mark, the horseshoe is more flexible than before the grinding. Additionally, where the inner surface of the rearward curved edge is ground away up to the middle scribe mark, the horseshoe is even more flexible. The more flexible horseshoe is generally preferable for a horse with an unhealthy hoof.

In a preferred embodiment, at least two nail hole patterns are defined between the upper and lower surfaces of each of the left and right branches. The inner and outer nail hole patterns allow use of the same horseshoe for both horses having healthy hoofs and unhealthy hoofs. In a typical application, the inside nail pattern is suited for use with a healthy hoof, and an outside nail pattern adjacent to the outside curved edge 26 is suited for use with a devastated or unhealthy hoof.

The inner and outer nail patterns tend to effect the hoof in two ways. First, the inside and outside nail patterns tend to be suited for attachment to horse's hoofs having different thicknesses. For example, the inside nail pattern allows attachment to a healthy hoof having $1/4$" to $3/8$" thickness. Such attachment would not be possible where the thickness was less, as is frequently the case where the hoof is not healthy.

Secondly, the inner and outer nail hole patterns result in different degrees of flexibility of the horseshoe. When a horse puts weight on a hoof, the hoof tends to expand radially outward. The use of the outer nail pattern results in greater mechanical advantage, thereby flexing the bridge portion of the horseshoe more when the horse puts weight on the shoe than would be the case with the inner nail hole pattern. As a result, the outer nail pattern tends to interact with, and benefit from, the flexible bridge. This interaction results in a more flexible horseshoe. Use of the outside nail pattern tends to result in the shoe being more flexible, which is beneficial when worn by a horse having a hoof that is damaged.

As seen in both FIGS. 1 and 2, in a preferred embodiment, an inner nail hole pattern 60 provides five generally rectangular nail holes 61 defined between the upper and lower surface of each of the branches 20, 30. In a preferred version, the centers of the inner nail holes are approximately $1/4$" to $3/8$" from the outside curved edge 26. Each nail hole provides a channel 63 that is defined between four sloping walls 62 defined between upper and lower surfaces 22, 23 of each branch. Due to the geometry of the sloping walls 62, the lower opening of each hole 61 adjacent to the lower surface 22 is somewhat larger than the upper opening of the hole adjacent to the upper surface 21.

As seen in both FIGS. 1 and 2, in a preferred embodiment, an outer nail hole pattern 70 provides four generally rectangular nail holes 71 defined between the upper and lower surface of each of the branches 20, 30. In a preferred version, the centers of the outer nail holes are approximately $1/8$" from the outside curved edge 26. Each nail hole provides a channel 73 that is defined between four sloping walls 72 defined between upper and lower surfaces 22, 23 of each branch. Due to the geometry of the sloping walls 72, the lower opening of each hole 71 adjacent to the lower surface 22 is somewhat larger than the upper opening of the hole adjacent to the upper surface 21.

In a preferred embodiment, each of the nail holes 71 in the outer nail hole pattern is typically slightly smaller than the nail holes 61 forming the inner nail pattern. The larger nail holes, and associated larger nails, are better adapted for use with thicker, healthy hoofs. The smaller nail holes and associate smaller nails are better adapted for use with thinner hoofs during the healing process.

The outer nail hole pattern is closer to the outside curved edge 26 of each branch, while the inner nail hole pattern is substantially centered between the inside and outside curved edges 25, 26.

Continuing to refer to FIGS. 1 and 2, at least one groove 80 is defined on the lower surface 22. A preferred groove provides four segments 81, one segment between each adjacent pair of the five inner nail holes forming the inner nail hole pattern. The groove results in better traction during use of the shoe. During installation the groove helps to allow the inner and outer nail hole patterns to be distinguished more readily by feel and by sight. A preferred version of the groove is approximately $1/16$" deep.

Alternatively, the groove may be located between adjacent pairs of outer nail holes forming the outer nail pattern.

In a still further alternative embodiment, as seen in FIG. 2, grooves 80 may be located between the holes forming both of the inner and outer nail hole patterns.

To use the horseshoe of the invention, the horse's hoof is examined, and it's health determined. Primarily based on the thickness of the hoof, the inner or outer hole is used. Where the hoof is healthy and approximately $1/4$" to $3/8$" thick, the inside nail hole pattern is used, and the shoe is installed with larger nails using a total of ten nails per shoe.

Where the hoof is unhealthy and approximately 1/8" thick, the outer nail hole pattern is used, and the shoe is installed with smaller nails using a total of eight nails per shoe. In this circumstance, the mechanical advantage of the outer nail hole pattern causes more leverage to result in a somewhat greater bending of the bridge 40.

The previously described versions of the present invention have many advantages, including a primary advantage of providing a novel horseshoe with at least two nail hole patterns, typically including inner and outer nail hole patterns, that allows use of the shoe with an outer nail hole pattern for horses having an unhealthy hoof during a healing process, and that allows use of the shoe with an inner nail hole pattern for horses having a healthy or recovered hoof.

Another advantage of the present invention is to provide a novel horseshoe with a flexible bridge portion, defined between the left and right branches, that flexes with the application of weight by the horse, thereby reducing the strain on the hoof. The flexible bridge interacts with a tapered region defined on a lower surface of each of the branches which tends to cause a radially outward force when weight is applied. Also, the flexible bridge interacts with the at least two nail patterns, since the magnitude of the radially outward force applied by the horse's hoof can be varied according to which nail pattern is used.

A still further advantage of the present invention is to provide a novel horseshoe with at least two nail hole patterns, typically including inner and outer nail hole patterns, wherein the nail holes comprising the outer nail hole pattern are smaller and adapted for use with smaller nails appropriate to a thinner, damaged hoof, and wherein the nail holes comprising the inner pattern are larger and adapted for use with larger nails appropriate to thicker, healthy hoofs.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while the preferred embodiment of the invention includes two nail hole patterns, an inner and an outer pattern, an alternative design could include additional patterns. Similarly, while a preferred number of nail holes has been disclosed in each nail hole pattern, an alternative number could be substituted. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A horseshoe comprising:
   (A) opposed left and right branches;
   (B) a bridge connecting the left and right branches;
   (C) an inner nail pattern defined between an upper and a lower surface of each of the left and right branches;
   (D) an outer nail pattern defined between an upper and a lower surface of each of the left and right branches; and
   (E) scribe marks defined on the lower surface of the bridge.

2. A horseshoe comprising:
   (A) opposed left and right branches;
   (B) a bridge connecting the left and right branches;
   (C) scribe marks defined on the lower surface of the bridge;
   (D) an inner nail pattern defined between an upper and a lower surface of each of the left and right branches;
   (E) an outer nail pattern defined between an upper and a lower surface of each of the left and right branches; and
   (F) tapered region means, defined in each branch, for interacting with the flexible bridge by tending to move the branches of the shoe away from each other when the horse applies weight.

3. The horseshoe of claim 2 wherein the outer nail hole pattern is closer to an outside curved edge than to a ridge line of the tapered region means of each of the left and right branches and wherein the inner nail hole pattern is substantially centered between the ridge line and inside curved edge.

4. The horseshoe of claim 2 wherein a groove defined in the lower surface of each of the branches, the groove linking the nail holes of the inner nail hole patterns.

* * * * *